W. MORRISON.
SECONDARY BATTERY.
APPLICATION FILED JUNE 8, 1903. RENEWED JULY 26, 1909.
945,186.
Patented Jan. 4, 1910.
2 SHEETS—SHEET 1.
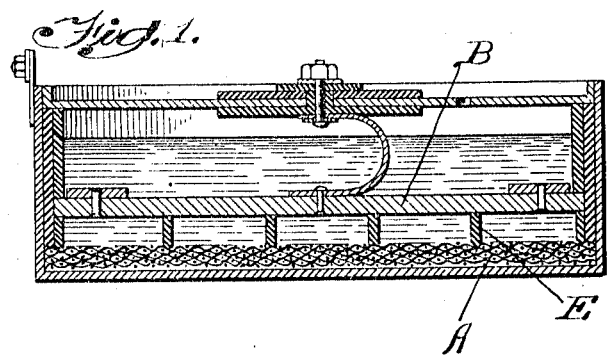
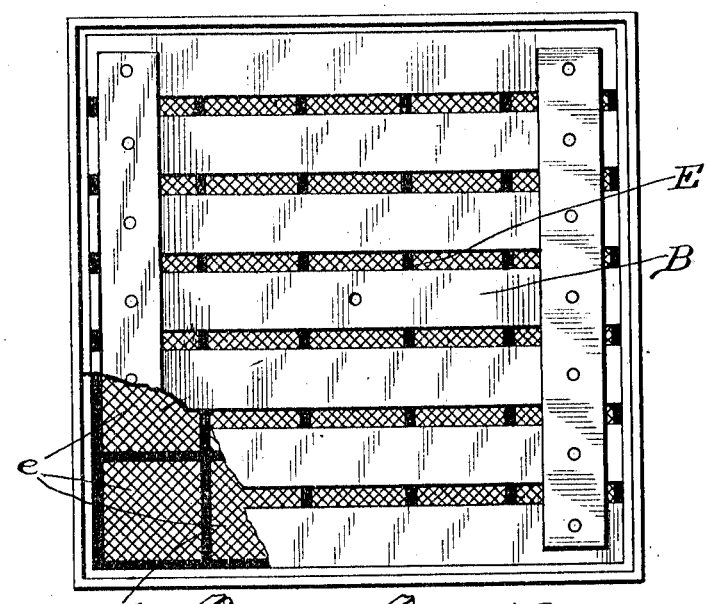
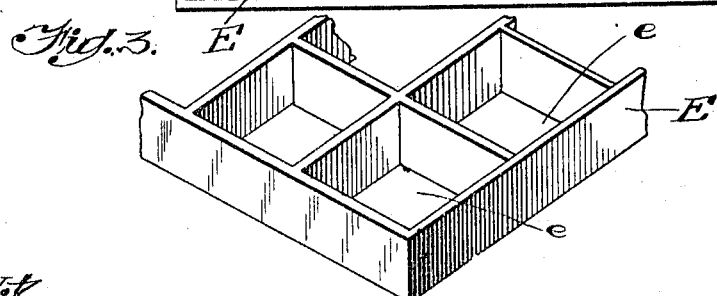

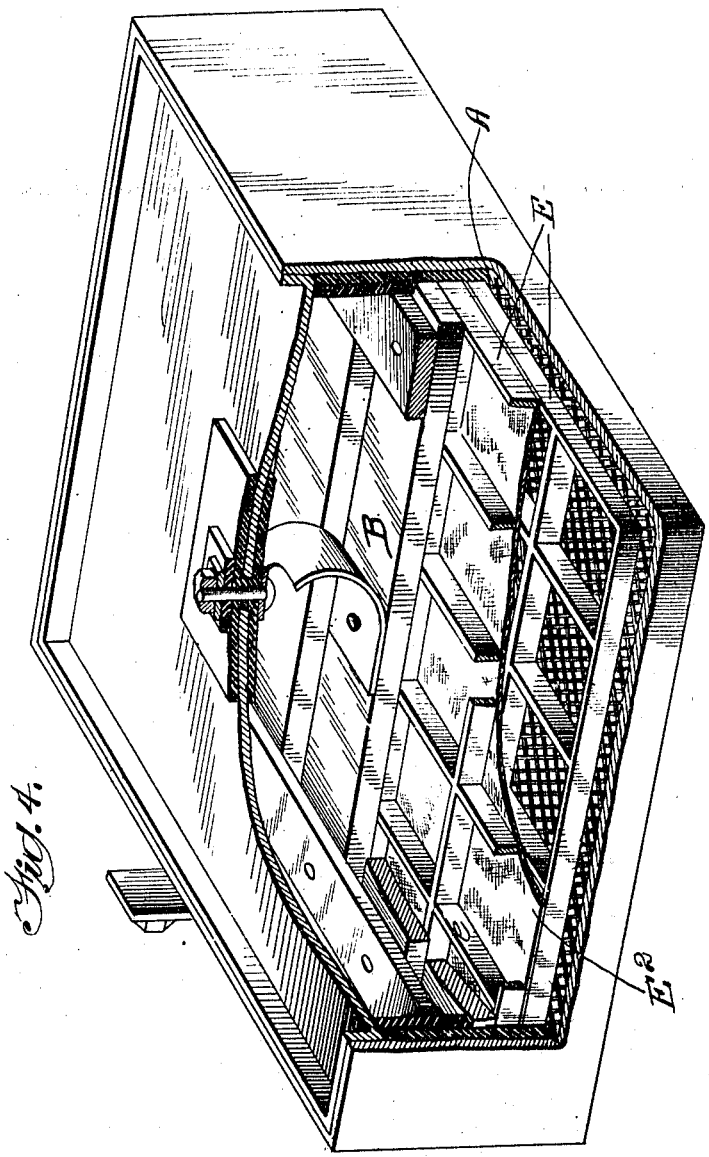

UNITED STATES PATENT OFFICE.

WILLIAM MORRISON, OF CHICAGO, ILLINOIS.

SECONDARY BATTERY.

945,186.   Specification of Letters Patent.   Patented Jan. 4, 1910.

Application filed June 8, 1903, Serial No. 160,648. Renewed July 26, 1909. Serial No. 509,699.

*To all whom it may concern:*

Be it known that I, WILLIAM MORRISON, a citizen of the United States of America, and resident of Chicago, Cook county, Illinois, have invented a certain new and useful Improvement in Secondary Batteries, (Case D,) of which the following is a specification.

My invention relates to a particular feature of improvement which is employed as a part of the construction of a battery in which there is an alkaline solution and in which zinc is the positive active element, said battery being particularly described in its complete form in an application filed concurrently herewith and designated as Serial Number 160,645, which has become Patent No. 916,575.

My present invention relates to certain improved means whereby to prevent the wash of the solution over and upon the top surface of the positive electrode and also prevent injury which may result from abnormal jars or other like disturbances.

My invention consists primarily in a protecting member which is disposed in a substantially horizontal plane between the positive and negative electrodes of the battery, which are also disposed substantially horizontally, said protector being immersed in the solution whereby the wash or continuous sweep of the solution is broken up into small areas, thus preventing the accumulation of a sufficient quantity of the positive active material, or such other materials as may possibly accumulate, and effectually overcoming the injurious effects which follow from short circuiting.

Reference may now be had to the accompanying drawings, in which:

Figure 1 is a cross section through a completed cell. Fig. 2 is a plan view with the negative electrode partly broken away showing the insulating protector in position. Fig. 3 is a detailed perspective view of a portion of the insulating partition. Fig. 4 is an enlarged perspective view of the complete battery broken away to show the interior construction, and also to illustrate a modified form in which a separating diaphragm is provided.

The positive electrode is disposed in a substantially horizontal position at or near the bottom of the cell and designated at A. The particular character of positive electrode herein shown has been described and claimed by me in another application filed concurrently herewith and designated as Serial Number 160,647. The negative electrode B is disposed above the positive electrode in a like substantially horizontal plane and is connected with a terminal to the opposite side of the cell. Between the negative electrode and the positive electrode is an insulating protector member E which is made of a suitable insulating material and is in the form of a grid having cells or openings e. This insulating protector located as it is above and upon the top surface of the positive electrode and immersed within the body of the solution, which solution is between and about the electrodes, presents a number of sections of comparatively small area which subdivides the solution into small areas. I found in my experiments and use of this battery under conditions when it received a swaying motion such as takes place in automobile work, that the unrestricted wash or sweep of the solution across the top surface of the positive electrode in this type of battery, which electrode is in a substantially horizontal plane, would detach an appreciable quantity of the active material or other material deposited upon the surface of the electrode and carrying it to the side of the cell and accumulating it in a sufficient quantity at some one or more particular point or points to cause a short circuit or short circuits between the electrodes during the operation of the battery. This insulating protector also performs another function in holding and insulating the negative electrode from the positive electrode uniformly and satisfactorily. The insulating protector, therefore, serves two purposes. The one to insulate the negative electrode from the positive electrode and hold the positive electrode firmly in place, and the other purpose to subdivide the interior of the cell between the positive and negative electrodes into sections of such size as to confine the wash of the solution within comparatively small areas, so that if the zinc in the solution should become detached from the positive electrode by the small amount of wash still remaining, or otherwise, it cannot shift such a distance as to gather together a sufficient quantity of zinc to short circuit, or otherwise affect the operation of the battery.

In Fig. 4 I have shown a modified form of construction of insulating protector which may be used as an extra precaution, which in many cases is of distinctive value. It consists of a double insulating member E, each of which are counterparts one of the other and between which is disposed and held a diaphragm $E^2$ which may be of a loose woven hempen cloth or other suitable porous material. The diaphragm should be made porous in order to permit the free circulation of the solution. This diaphragm held as it is in place by the two-part insulating protector and disposed between the two electrodes in a horizontal plane assists in preventing the accumulation of material from one electrode to the other and also assists in preventing the accumulation of detached portions of one electrode upon the other. This diaphragm also assists in preventing the wash of the solution from interfering with the operation of the battery. It is evident that the diaphragm $E^2$ may be disposed upon the top of the insulator shown in Figs. 2 and 3 with similar results. It is also obvious that this intermediate diaphragm is not indispensable to the operation of the battery but in many cases can be used to advantage.

Having thus described my invention, what I claim as new and desire to procure by Letters Patent is:

1. In a reversible electric galvanic battery, an alkaline solution, a positive zinc electrode in a substantially horizontal plane disposed at or near the bottom of the cell, a negative element in a substantially horizontal plane above said positive electrode, and a separator comprising a series of partitions positioned on top of the positive active material of the positive electrode whereby the electrolyte between the electrodes is subdivided into a plurality of comparatively small portions.

2. In a reversible electric galvanic battery, an alkaline solution, a positive zinc electrode in a substantially horizontal plane disposed at or near the bottom of the cell, a negative element in a substantially horizontal plane above said positive electrode, and a separator comprising a series of vertical partitions in combination with a porous diaphragm interposed therebetween, whereby the electrolyte between the electrodes is subdivided into a plurality of comparatively small portions.

Signed by me at Chicago, Cook county, Illinois, this 6th day of June, 1903.

WILLIAM MORRISON.

Witnesses:
CHAS. C. BULKLEY,
WM. A. HARDERS.